United States Patent
Bae et al.

(10) Patent No.: US 10,047,827 B2
(45) Date of Patent: Aug. 14, 2018

(54) LOW-PROFILE, ROTATING-SHAFT TRANSMISSION DEVICE, AND ASSOCIATED METHOD

(71) Applicant: The Boeing Company, Huntington Beach, CA (US)

(72) Inventors: Kwan-Ho Bae, Mukilteo, WA (US); Kenneth L. Parcher, Clackamus, OR (US); Robert M. Murphy, Everett, WA (US)

(73) Assignee: The Boeing Company, Huntington Beach, CA (US)

( * ) Notice: Subject to any disclaimer, the term of this patent is extended or adjusted under 35 U.S.C. 154(b) by 63 days.

(21) Appl. No.: 15/055,294

(22) Filed: Feb. 26, 2016

(65) Prior Publication Data
US 2017/0248194 A1     Aug. 31, 2017

(51) Int. Cl.
| | |
|---|---|
| *F16H 1/00* | (2006.01) |
| *F16H 1/20* | (2006.01) |
| *F16H 55/17* | (2006.01) |
| *F16H 57/023* | (2012.01) |

(52) U.S. Cl.
CPC ............. *F16H 1/203* (2013.01); *F16H 55/17* (2013.01); *F16H 57/023* (2013.01)

(58) Field of Classification Search
CPC ........ F16H 1/203; F16H 57/023; F16H 55/17; F16H 1/20; B64C 13/34
See application file for complete search history.

(56) References Cited

U.S. PATENT DOCUMENTS

| | | | | |
|---|---|---|---|---|
| 2,487,020 | A * | 11/1949 | Gilerease | B64C 27/10 244/17.11 |
| 4,489,625 | A * | 12/1984 | White | B64C 27/14 244/60 |
| 5,271,295 | A * | 12/1993 | Marnot | B64C 27/14 244/58 |

(Continued)

FOREIGN PATENT DOCUMENTS

| | | |
|---|---|---|
| CN | 203 477 276 | 3/2014 |
| DE | 10 2007 058903 | 6/2009 |

OTHER PUBLICATIONS

Extended European Search Report for European Application No. 17153904.2, dated Jul. 20, 2017.

*Primary Examiner* — Victor L MacArthur
(74) *Attorney, Agent, or Firm* — Womble Bond Dickinson (US) LLP (57) ABSTRACT

A transmission device, comprising an offset gearbox assembly coupling rotatable input and output shafts extending in respective input and output axial directions. An output gear is mounted in the offset gearbox assembly and is rotatable in a drive direction about an output gear axis to rotate the output shaft coupled therewith. An idler gear coupled to the output gear is rotatable about an idler gear axis in association with the output gear. An input gear assembly is coupled to the idler gear, is rotatable about an input gear axis in association with the idler gear, and is coupled to the input shaft such that rotation of the input shaft causes rotation of the output gear in the drive direction. The input gear assembly has the input shaft coupled therewith such that the input axial direction is nonparallel to the output axial direction. An associated method is also provided.

7 Claims, 7 Drawing Sheets

(56) References Cited

U.S. PATENT DOCUMENTS

| | | | | |
|---|---|---|---|---|
| 6,513,401 | B2 * | 2/2003 | Bologna | F16H 57/023 74/325 |
| 6,605,018 | B2 * | 8/2003 | Palazzolo | B60K 17/344 475/222 |
| 7,413,142 | B2 * | 8/2008 | Gmirya | B64C 27/10 244/17.23 |
| 2001/0010177 | A1 * | 8/2001 | Bologna | F16H 57/023 74/397 |
| 2004/0226766 | A1 * | 11/2004 | Cook | B60K 17/344 180/233 |
| 2004/0231444 | A1 * | 11/2004 | Leposky | B60K 17/344 74/424 |
| 2004/0235605 | A1 * | 11/2004 | Cook | B60K 17/344 475/220 |
| 2006/0266883 | A1 * | 11/2006 | Gmirya | B64C 27/10 244/60 |
| 2007/0006675 | A1 * | 1/2007 | Marla | B60K 17/344 74/424 |
| 2011/0265594 | A1 | 11/2011 | Ramirez, Jr. et al. | |

* cited by examiner

LOW-PROFILE, ROTATING-SHAFT TRANSMISSION DEVICE, AND ASSOCIATED METHOD

BACKGROUND

Field of the Disclosure

The present disclosure is directed to a low-profile, rotating-shaft transmission device for coupling opposed, non-intersecting, rotatable shafts so as to transmit torque therebetween.

Description of Related Art

Figure 1:
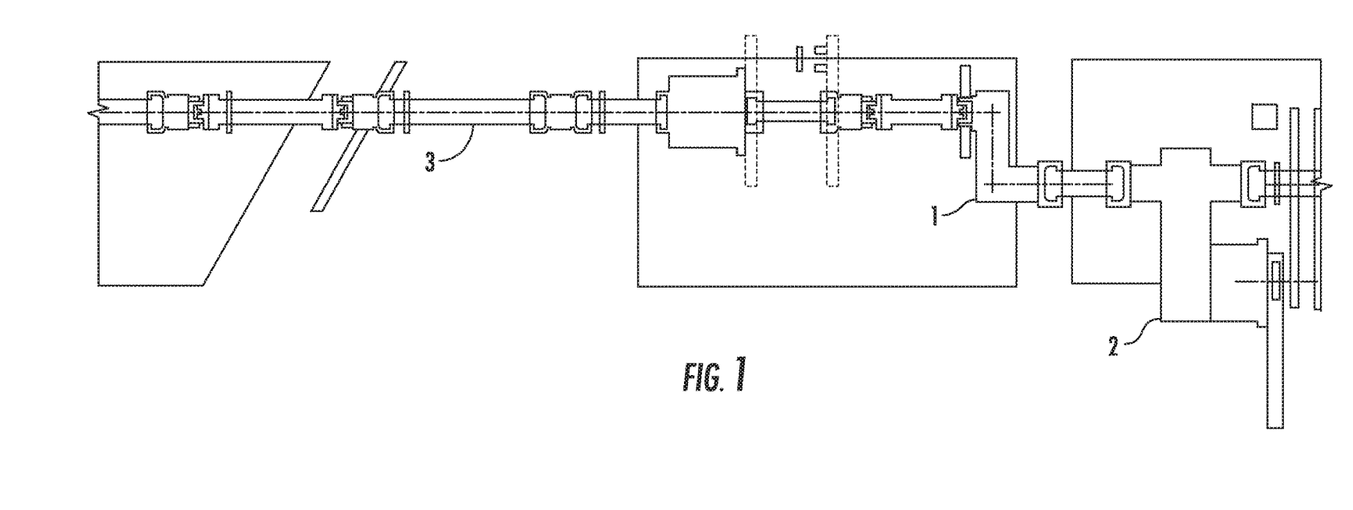
FIG. 1 schematically illustrates a rotating-shaft transmission device implemented in a wing flap drive mechanism of an aircraft.

As shown in FIG. 1, an offset gearbox 1 may be implemented in instances requiring the transmission of torque between non-intersecting (i.e., offset) rotatable shafts, wherein the shafts may extend in different directions. Such a situation may be encountered, for example, in relation to drive mechanisms for wing flaps on aircraft, where the actuator 2 for the drive mechanism may be disposed within the fuselage. In such instances, the rotating shafts 3 necessary to operate the flaps must be directed away from the fuselage and about various structural aspects of the wing in order to extend into engagement with the flap. However, there may often be limited space or clearance area in which to implement the actuator and drive mechanism, particularly through the wing structure of such aircraft.

Figure 2:
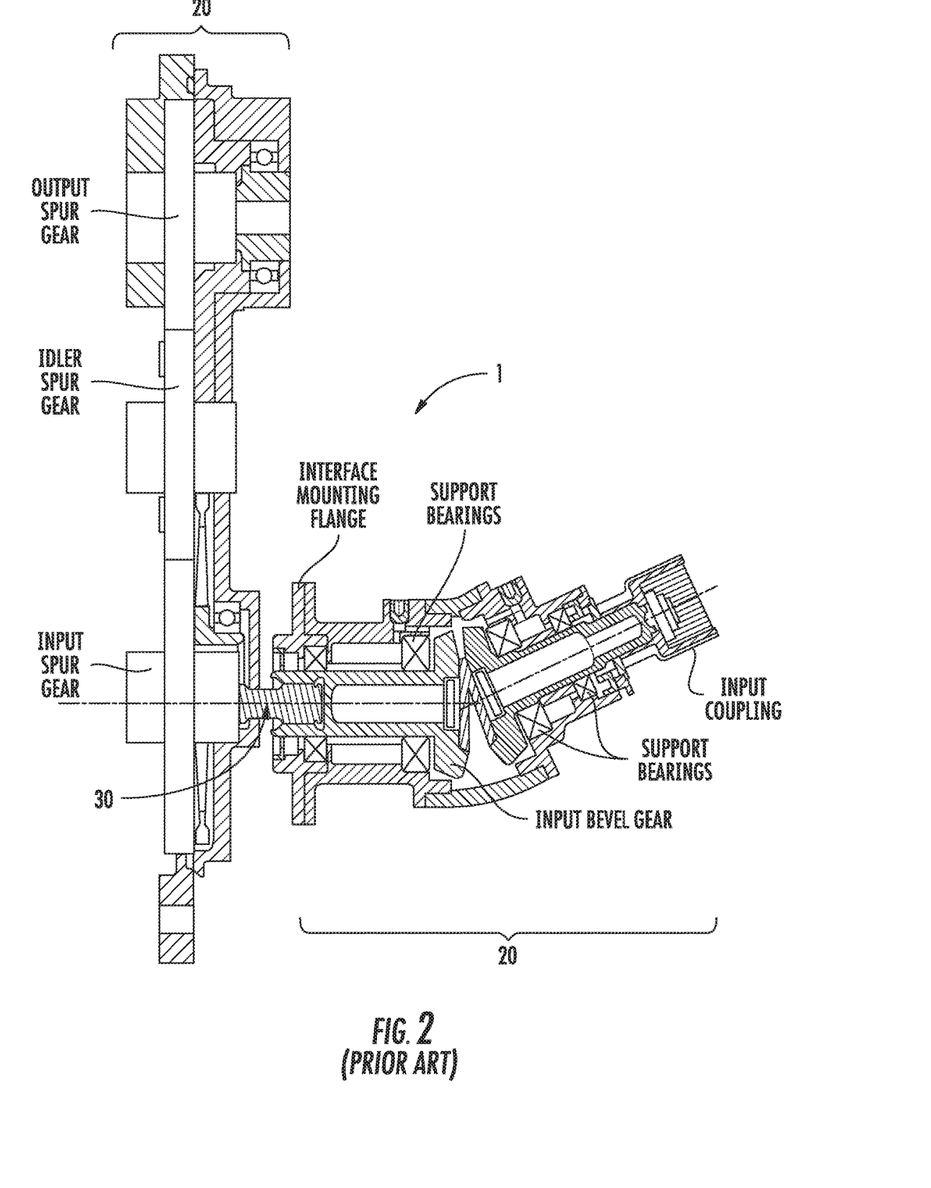
FIG. 2 schematically illustrates a conventional offset gearbox arrangement, according to the prior art.

In some instances, such an offset gearbox 1 may implement an arrangement of conventional bevel gears (i.e., a bevel gear gearbox 10) in conjunction with and attached to a separate arrangement of spur gears (i.e., a spur gear gearbox 20), as shown, for example, in FIG. 2. In such instances, the bevel gear gearbox 10 and the spur gear gearbox 20 may be connected by way of a separate rotating shaft 30 between the output of the bevel gear gearbox and the input of the spur gear gearbox, with the cooperating gearboxes 10, 20 providing the desired offset.

Such conventional offset gearboxes, however, may be difficult to implement when the particular application is associated with limited space or tight clearance area, since the footprint, size (volume), and/or weight of a conventional offset gearbox may not be conducive to that application. Further, the limited space or tight clearance area may require a complex arrangement of shafts and gearboxes, which may also present, for example, efficiency, weight and cost challenges in the application.

As such, there exists a need for a rotating-shaft transmission device that addresses issues such as footprint, size (volume), weight, complexity and number of components, transmission efficiency, set-up requirements, and cost, which may be lacking in conventional arrangements using conventional offset gearboxes.

SUMMARY OF THE DISCLOSURE

The above and other needs are met by aspects of the present disclosure which, in one aspect, provides a low-profile, rotating-shaft transmission device, wherein such a device may comprise an offset gearbox assembly configured to couple rotatable input and output shafts, the output shaft extending in an output axial direction and the input shaft extending in an input axial direction. An output gear is mounted in the offset gearbox assembly so as to be coupled to the output shaft, and to be rotatable in a drive direction about an output gear axis to rotate the output shaft. An idler gear is mounted in the offset gearbox assembly so as to be coupled to the output gear and to be rotatable about an idler gear axis in association with the output gear. An input gear assembly is mounted in the offset gearbox assembly so as to be coupled to the idler gear and to be rotatable about an input gear axis in association with the idler gear. The input gear assembly is arranged to be coupled to the input shaft such that rotation of the input shaft causes rotation of the output gear in the drive direction via the input gear assembly and the idler gear. The input gear assembly has the input shaft coupled therewith such that the input axial direction of the input shaft is nonparallel to the output axial direction of the output shaft.

Another aspect of the present disclosure provides a method of manufacturing a low-profile, rotating-shaft transmission device, wherein such a method comprises mounting an output gear in an offset gearbox assembly, configured to couple rotatable input and output shafts, such that the output gear is rotatable in a drive direction about an output gear axis to rotate the output shaft coupled thereto, the output shaft extending in an output axial direction and the input shaft extending in an input axial direction. An idler gear is mounted in the offset gearbox assembly, such that the idler gear is coupled to the output gear and is rotatable about an idler gear axis in association with the output gear. An input gear assembly is mounted in the offset gearbox assembly, such that the input gear assembly is coupled to the idler gear and is rotatable about an input gear axis in association with the idler gear, with the input gear assembly being coupled to the input shaft such that rotation of the input shaft causes rotation of the output gear in the drive direction via the input gear assembly and the idler gear, and with the input gear assembly having the input shaft coupled therewith such that the input axial direction of the input shaft is nonparallel to the output axial direction of the output shaft.

The aspects, functions and advantages discussed herein may be achieved independently in various example implementations/aspects or may be combined in yet other example implementations/aspects, further details of which may be seen with reference to the following description and drawings.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will be thorough and complete, will fully convey the scope of the disclosure to those skilled in the art, and will satisfy applicable legal requirements. Like numbers refer to like elements throughout. As used in this specification and the claims, the singular forms "a," "an," and "the" include plural referents unless the context clearly dictates otherwise.

As schematically illustrated in FIGS. 3-6, various aspects of the present disclosure provides a low-profile, rotating-shaft transmission device 100. Such a transmission device 100 may comprise an offset gearbox assembly 150, which may include a gearbox housing or casing. The offset gearbox assembly 150 may be configured to couple a rotatable input shaft 60 and a rotatable output shaft 50, for example, such that torque can be transmitted between the rotatable shafts 50, 60. Generally, the output shaft 50 extends in an output axial direction 70 and the input shaft 60 extends in an input axial direction 80, and the respective ends of the shafts 50, 60 do not intersect (i.e., the ends of the shafts 50, 60 engaging the offset gearbox assembly 150 are offset from each other).

Figure 3:
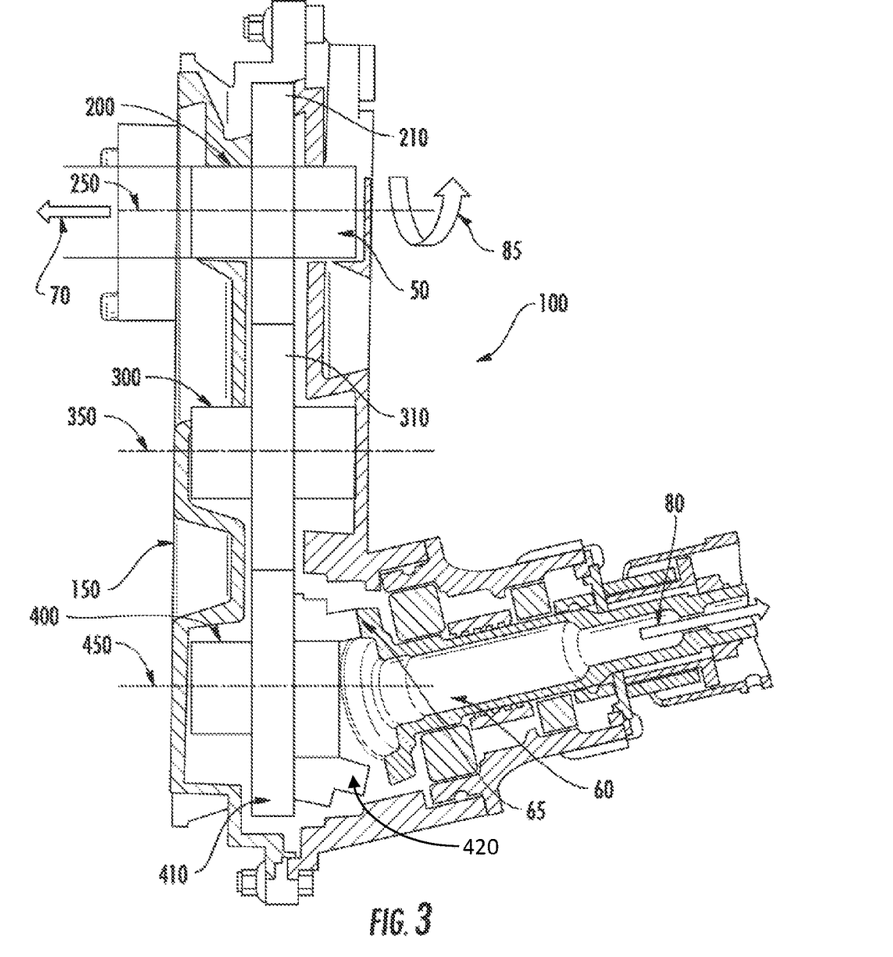
FIG. 3 schematically illustrates a cross-sectional view of a low-profile, rotating-shaft transmission device, according to one aspect of the present disclosure.
Figure 4:
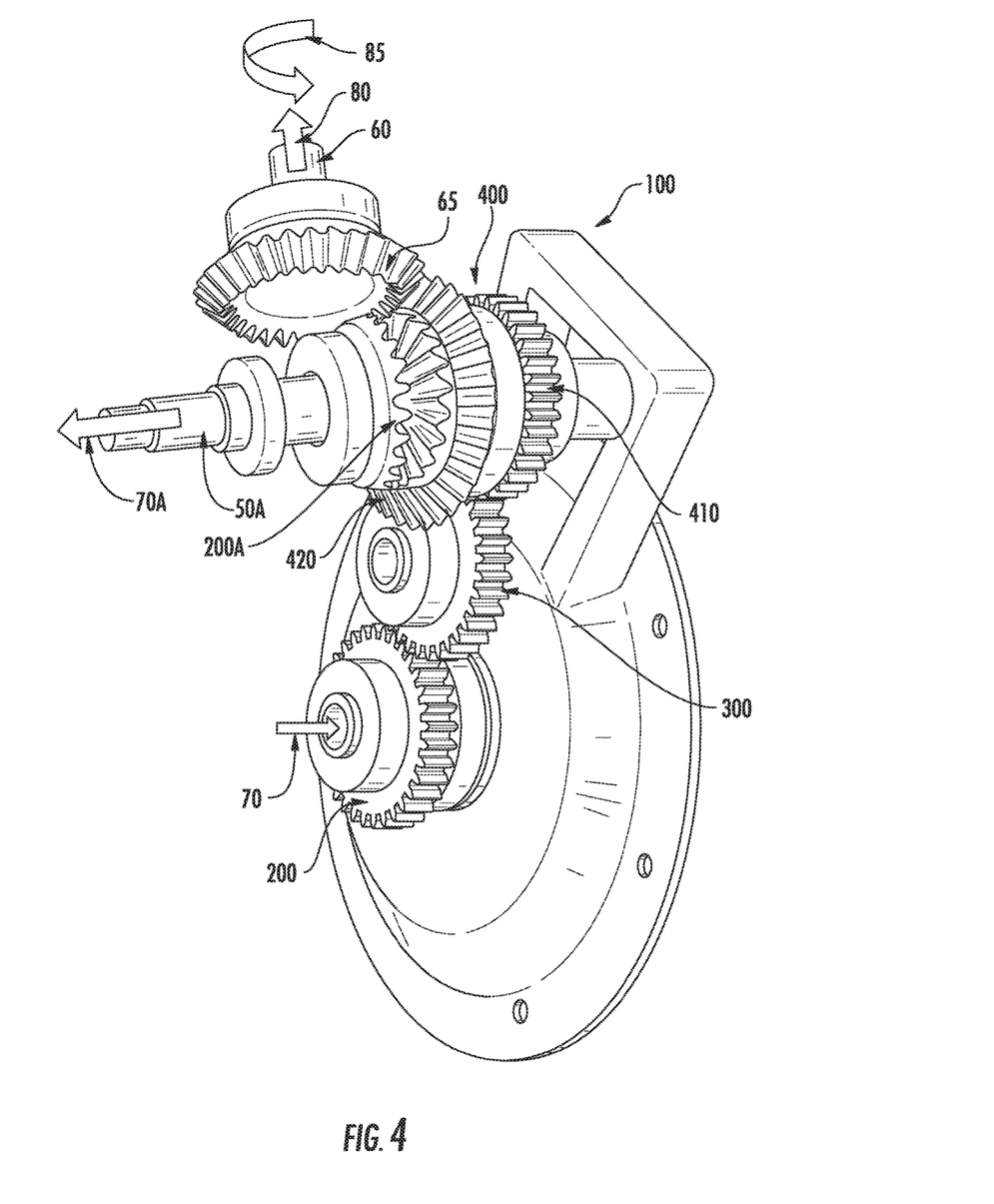
FIG. 4 schematically illustrates a three dimensional view of a low-profile, rotating-shaft transmission device, according to one aspect of the present disclosure.

As shown in FIGS. 3 and 4, an output gear 200 is mounted in the offset gearbox assembly 150 so as to be coupled to the output shaft 50 and to be rotatable in a drive direction 85 about an output gear axis 250 to rotate the output shaft 50 (i.e., in a desired direction, which may be the drive direction 85). An idler gear 300 is mounted in the offset gearbox assembly 150 so as to be coupled to the output gear 200 and to be rotatable about an idler gear axis 350 in association with the output gear 200. For the output gear 200 rotating in the drive direction 85, the idler gear 300 engaged therewith rotates in a direction opposite to the drive direction 85. An input gear assembly 400 is mounted in the offset gearbox assembly 150 so as to be coupled to the idler gear 300 and to be rotatable about an input gear axis 450 in association with the idler gear 300. More particularly, the input gear assembly 400 is arranged to be coupled to the input shaft 60 such that rotation of the input shaft 60 causes rotation of the output gear 200 in the drive direction via the input gear assembly 400 and the idler gear 300. Accordingly, in light of the coupled relationship between the input gear assembly 400, the idler gear 300, and the output gear 200, the input gear assembly 400 is arranged to rotate in the drive direction 85 so as to, in turn, drive the idler gear 300 and the output gear 200. In order to form and provide the offset arrangement for coupling the offset ends of the output and input shafts 50, 60, the input gear assembly 400 has the input shaft 60 coupled therewith such that the input axial direction 80 of the input shaft 60 is nonparallel to the output axial direction 70 of the output shaft 50.

In some aspects, as shown in FIGS. 3 and 4, the output gear 200 may be an output spur gear 210 having teeth extending parallel to the output gear axis 250. Further, the idler gear 300 may be an idler spur gear 310 having teeth extending parallel to the idler gear axis 350. In such aspects, the input gear assembly 400 may comprise an input spur gear 410 having teeth extending parallel to the input gear axis 450, and an input bevel gear 420 coupled to the input spur gear 410 and rotatable in conjunction therewith, wherein the input bevel gear 420 is, in turn, coupled to the input shaft 60 extending in the input axial direction 80. That is, the input spur gear 410 may be attached or otherwise secured to the input bevel gear 420 (i.e., without a connecting shaft therebetween) of the input gear assembly 400 such that the input spur gear 410 and the input bevel gear 420 are arranged side-by-side adjacent to each other (i.e., secured together so as to be rotatable as a unit). In some instances, the input spur gear 410 and the input bevel gear 420 may be integrally formed, or otherwise coupled together in a side-by-side relationship to form an integral unit. Accordingly, the arrangement between the output gear 200, the idler gear 300, and the input gear assembly 400 addresses the offset between the non-intersecting or non-engaging ends of the output and input shafts 50, 60, while the input spur gear 410 addresses an input shaft 60 which engages the offset gearbox assembly 150 at a different angle (i.e., nonparallel) in comparison to the angle at which the output shaft 50 engages the offset gearbox assembly 150.

In some instances, an input shaft bevel gear 65 may be coupled to the input shaft 60. The input shaft bevel gear 65 may further be coupled to or otherwise engaged with the input bevel gear 420 of the input gear assembly 400 such that rotation of the input shaft 60 rotates the input gear assembly 400 via the engagement between the input shaft bevel gear 65 and the input bevel gear 420. More particularly, the input shaft bevel gear 65 (i.e., the teeth thereof) may be configured to engage the input bevel gear 420 (i.e., the teeth thereof) such that rotation of the input shaft 60 causes the input gear assembly 400, including the input spur gear 410, to rotate in the drive direction 85.

Figure 5:
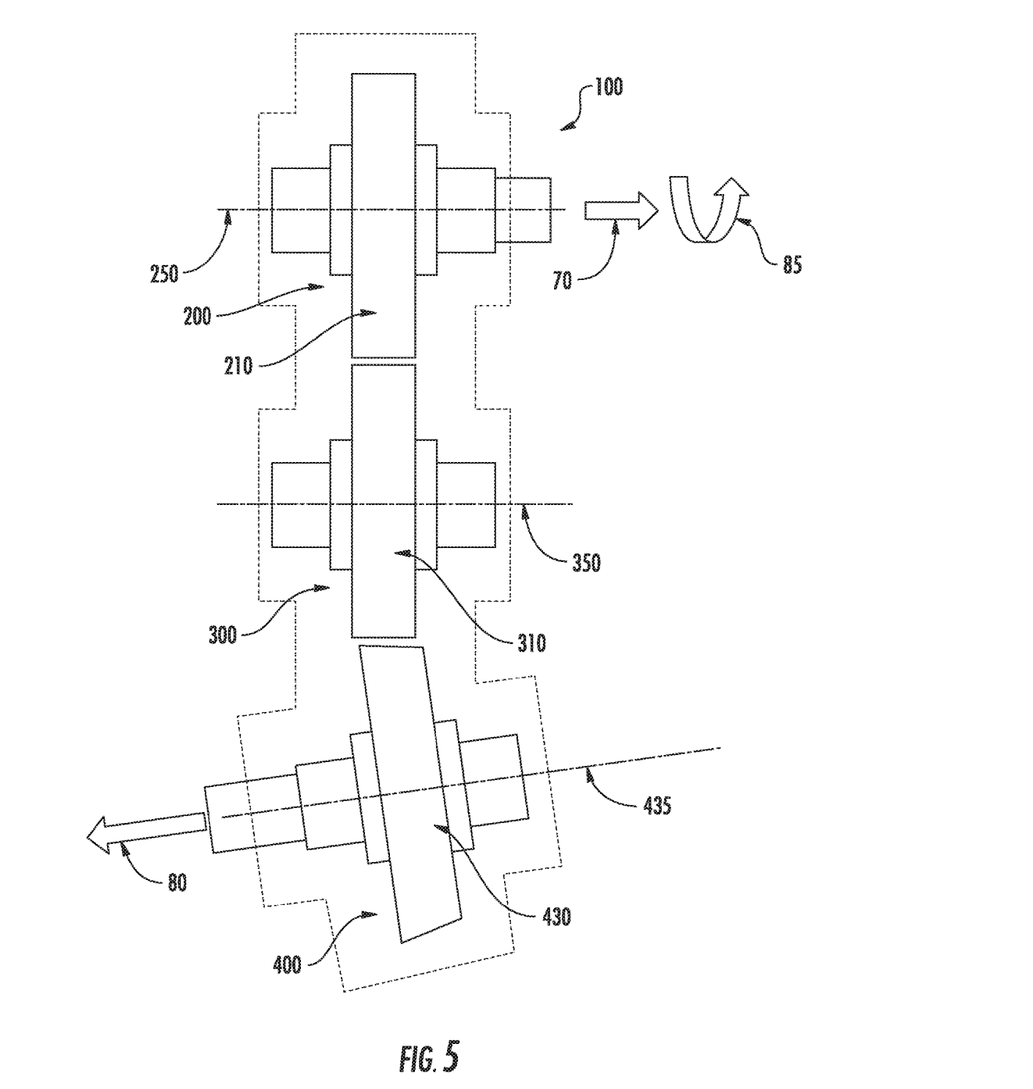
FIG. 5 schematically illustrates a low-profile, rotating-shaft transmission device, according to another aspect of the present disclosure.

In an alternate aspect, as shown in FIG. 5, instead of the input gear assembly 400 comprising an input spur gear 410 attached to or integrally formed with an input bevel gear 420, the input gear assembly 400 may comprise, for example, an input beveloid gear 430, such as a conical beveloid gear, coupled to the input shaft 60 extending in the input axial direction 80. That is, in such instances, the input beveloid gear 430 may be configured and arranged such that the teeth thereof mesh with or otherwise engage the teeth of the idler spur gear 310 such that the input beveloid gear axis 435, about which the input beveloid gear 430 rotates, is nonparallel to the idler gear axis 350. Accordingly, the input shaft 60 may be directly engaged with the input beveloid gear 430 and, as such, the input axial direction 80 of the input shaft 60 may be coincident with the input beveloid gear axis 435. Therefore, in such instances, the input axial direction 80, like the input beveloid gear axis 435, will be nonparallel to the idler gear axis 350, and also nonparallel to the output gear axis 250 or the output axial direction 70. In some aspects, as necessary or desired, an input shaft beveloid gear (not shown) may be engaged with the input shaft 60 and may be configured to be coupled to the input beveloid gear 430 to interact therewith. Accordingly, in such aspects, the input axial direction 80 may not necessarily be coincident with the input beveloid gear axis 435, but still nonparallel to the output axial direction 70.

Figure 6:
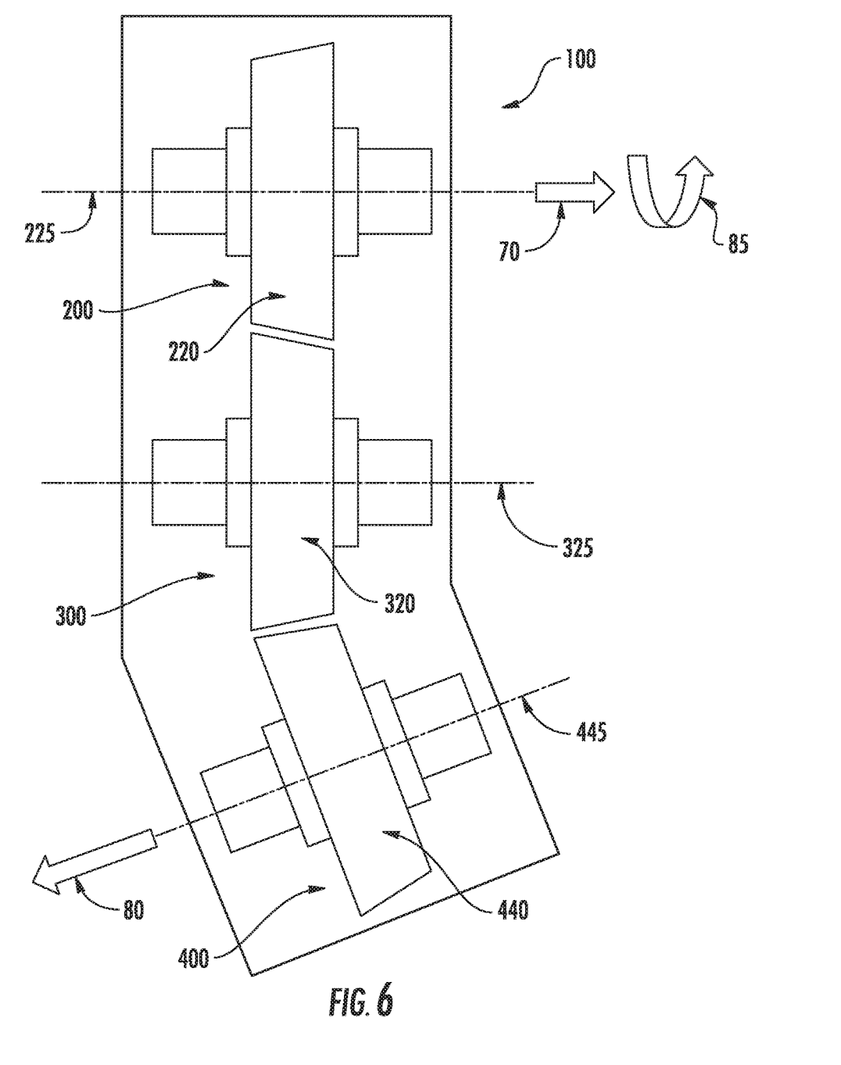
FIG. 6 schematically illustrates a low-profile, rotating-shaft transmission device, according to yet another aspect of the present disclosure.

In yet another aspect, as shown in FIG. 6, the transmission device 100 may be configured such that the output gear 200 is an output beveloid gear 220, the idler gear 300 is an idler beveloid gear 320, and the input gear 400 is an input beveloid gear 440 coupled to the input shaft 60 extending in the input axial direction 80. More particularly, the output beveloid gear 220, the idler beveloid gear 320, and the input beveloid gear 440 may each be configured as a conical beveloid gear, with the orientations of the output beveloid gear 220 and the idler beveloid gear 320 being reversed with respect to each other such that the output beveloid gear axis 225 is parallel to the idler beveloid gear axis 325. In such instances, the input beveloid gear 440 may be configured and arranged such that the teeth thereof mesh with or otherwise engage the teeth of the idler beveloid gear 320 such that the input beveloid gear axis 445, about which the input beveloid gear 440 rotates, is nonparallel to the idler beveloid gear axis 325. Accordingly, the input shaft 60 may be directly engaged with the input beveloid gear 440 and, as such, the input axial direction 80 of the input shaft 60 may be coincident with the input beveloid gear axis 445. Therefore, in such instances, the input axial direction 60, like the input beveloid gear axis 445, will be nonparallel to the idler beveloid gear axis 325, and also nonparallel to the output beveloid gear axis 225 or the output axial direction 70. In some aspects, as necessary or desired, an input shaft beveloid gear (not shown) may be engaged with the input shaft 60 and may be configured to be coupled to the input beveloid gear 440 to interact therewith. Accordingly, in such aspects, the input axial direction 80 may not necessarily be coincident with the input beveloid gear axis 445, but still nonparallel to the output axial direction 70.

With regard to the aspects of a transmission device 100 as disclosed herein, in some instances, the output shaft 50 may be configured to be coupled to the output gear 200 such that the output axial direction 70 is coincident with the output gear axis 250. Further, the output gear 200 may be configured to be coupled to the idler gear 300 such that the output gear axis 250 is parallel to the idler gear axis 350. Also, as will be appreciated by one skilled in the art, the aspects of a transmission device 100 as disclosed herein may include other elements necessary for mounting the gears within the offset gearbox assembly 150 such as, for example, shafts, bearings, shims, fasteners, etc. As such, it will be understood that the various aspects of a transmission device 100 disclosed herein will include any combination of such other elements required for the transmission device 100 to accomplish the purposes and functions related to those aspects, even though such other elements may not be expressly described in conjunction with those aspects.

Figure 7:
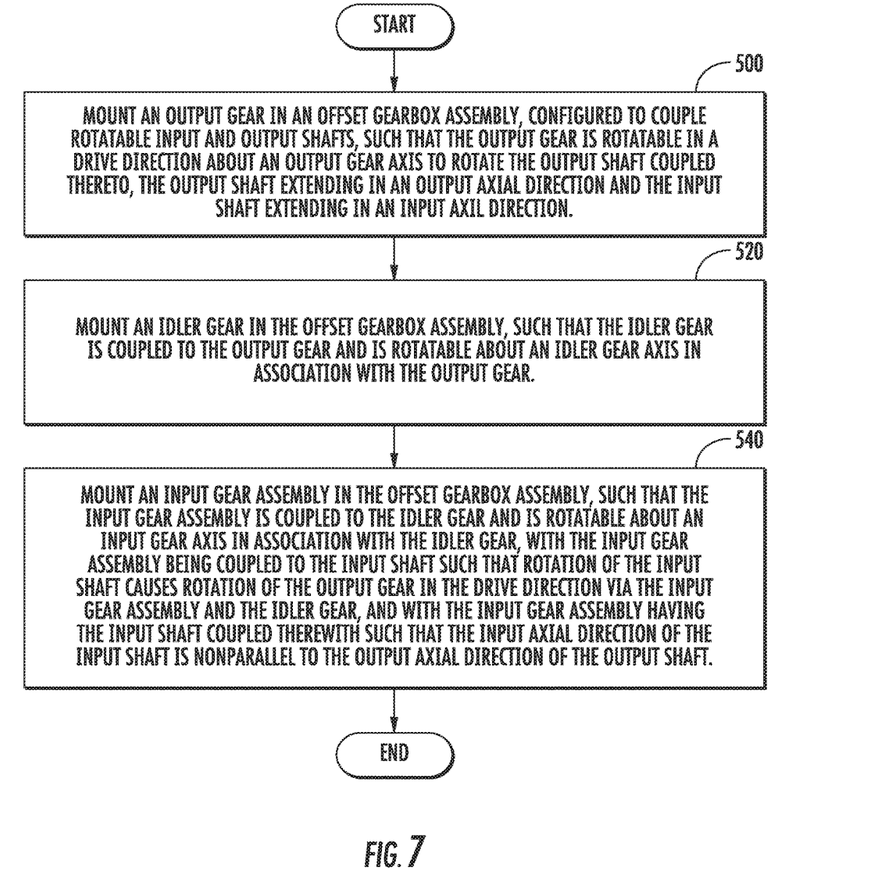
FIG. 7 schematically illustrates a method of forming a low-profile, rotating-shaft transmission device, according to one aspect of the present disclosure.

FIG. 7 schematically illustrates a method of manufacturing a low-profile, rotating-shaft transmission device. Such a method comprises mounting an output gear in an offset gearbox assembly, configured to couple rotatable input and output shafts, such that the output gear is coupled to and rotates the output shaft, wherein the output shaft extends in an output axial direction and the input shaft extends in an input axial direction and is rotatable in a drive direction (Block 500). An idler gear is mounted in the offset gearbox assembly, such that the idler gear is coupled to the output gear and is rotatable in association therewith (Block 520). An input gear assembly is mounted in the offset gearbox assembly, such that the input gear assembly is coupled to the idler gear and is rotatable in association therewith, with the input gear assembly being coupled to the input shaft such that rotation of the input shaft in the drive direction causes rotation of the output shaft in the drive direction via the input gear assembly, the idler gear, and the output gear, and with the input gear assembly having the input shaft coupled therewith such that the input axial direction of the input shaft is nonparallel to the output axial direction of the output shaft (Block 540). Other aspects and/or steps of such a method of manufacturing a low-profile, rotating-shaft transmission device are otherwise disclosed in connection with the disclosure of the various embodiments and aspects of a low-profile, rotating-shaft transmission device otherwise addressed herein.

Aspects of the present disclosure thus provide a low-profile, rotating-shaft transmission device for coupling opposed, non-intersecting, rotatable shafts so as to transmit torque therebetween, and an associated method, which may allow the realization of improvements that address issues with conventional offset gearbox devices, such as, for example, a smaller footprint, a smaller size (volume), lower weight, reduced complexity and/or a reduced number of components, increased torque transmission efficiency, lower set-up requirements, and/or lower cost, any of which may be lacking in conventional arrangements using conventional offset gearboxes.

Many modifications and other aspects of the disclosures set forth herein will come to mind to one skilled in the art to which these disclosures pertain having the benefit of the teachings presented in the foregoing descriptions and the associated drawings. For example, though one element of the various aspects of the transmission device 100 disclosed herein has been termed an "output gear" (i.e., output gear 200) and another element has been termed an "input gear assembly" (i.e., input gear assembly 400), the arrangement of the transmission device 100 evidences that torque transmission therethrough can be reversed, if necessary or desired. That is, in some aspects, the torque output or output gear may be represented by the "input gear assembly 400," while the torque input or input gear assembly may be represented by the "output gear 200." In another example, as shown in FIG. 4, the transmission device 100 may include more than one output gear. More particularly, for instance, the input gear assembly 400 may be configured so as to engage a second output gear 200A engaged with a second output shaft 50A extending in a second output axial direction 70A, so as to drive the second output gear 200A in addition to the output gear 200 driven by the idler gear 300. Therefore, it is to be understood that the disclosures are not to be limited to the specific aspects disclosed and that equivalents, modifications, and other aspects are intended to be included within the scope of the appended claims. Although specific terms are employed herein, they are used in a generic and descriptive sense only and not for purposes of limitation.

That which is claimed:

1. A low-profile, rotating-shaft transmission device, comprising:
    an offset gearbox assembly including a gearbox housing and being configured to couple rotatable input and output shafts, the output shaft extending in an output axial direction and the input shaft extending in an input axial direction;
    an output gear mounted in the gearbox housing and coupled to the output shaft so as to be rotatable in a drive direction about an output gear axis to rotate the output shaft;
    an idler gear mounted in the gearbox housing and coupled to the output gear so as to be rotatable about an idler gear axis in association with the output gear; and
    an input gear assembly including an input spur gear having teeth extending parallel to the input gear axis and coupled to the idler gear, and an input bevel gear directly coupled to the input spur gear and rotatable in conjunction therewith about an input gear axis in association with the idler gear, the input gear assembly being arranged such that the input spur gear and the input bevel gear directly coupled thereto are disposed within the gearbox housing, wherein the input bevel gear is configured to engage an input shaft bevel gear coupled to the input shaft extending into the gearbox housing such that rotation of the input shaft causes rotation of the output gear in the drive direction via the input gear assembly and the idler gear, and wherein the input gear assembly has the input shaft coupled therewith via the input bevel gear and the input shaft bevel gear such that the input axial direction of the input shaft is nonparallel to the output axial direction of the output shaft.

2. The device of claim 1, wherein the output gear is an output spur gear having teeth extending parallel to the output gear axis.

3. The device of claim 1, wherein the idler gear is an idler spur gear having teeth extending parallel to the idler gear axis.

4. The device of claim 1, wherein the input gear assembly comprises an input beveloid gear coupled to the input shaft extending in the input axial direction.

5. The device of claim 1, wherein the output gear is an output beveloid gear, the idler gear is an idler beveloid gear, and the input gear is an input beveloid gear coupled to the input shaft extending in the input axial direction.

6. The device of claim 1, wherein the output shaft is coupled to the output gear such that the output axial direction is coincident with the output gear axis.

7. The device of claim 1, wherein the output gear is coupled to the idler gear such that the output gear axis is parallel to the idler gear axis.

\* \* \* \* \*